No. 738,915. PATENTED SEPT. 15, 1903.
A. JUIF.
COOLING AND FILLING APPARATUS.
APPLICATION FILED DEC. 13, 1902.
NO MODEL.

Witnesses
C. H. Walker
Geo. E. Few

Inventor
Andrew Juif
By
Milo B. Stevens & Co.
Attorneys

No. 738,915.  Patented September 15, 1903.

UNITED STATES PATENT OFFICE.

ANDREW JUIF, OF DETROIT, MICHIGAN.

COOLING AND FILLING APPARATUS.

SPECIFICATION forming part of Letters Patent No. 738,915, dated September 15, 1903.

Application filed December 13, 1902. Serial No. 135,048. (No model.)

*To all whom it may concern:*

Be it known that I, ANDREW JUIF, a citizen of the United States, residing at Detroit, in the county of Wayne and State of Michigan, have invented certain new and useful Improvements in Cooling and Filling Apparatus; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention comprises particularly a device for cooling white lead preparatory to canning or barreling the same. The treatment of white lead in the manufacture thereof causes it to become heated, and it is essential and desirable that it be cooled before being run into cans or kegs for shipping and storing.

The object of my invention is to provide a novel apparatus for cooling the lead and for stirring the same while it is running through a funnel into the keg or other receptacle. The lead is generally too thick to flow freely and needs to be stirred and forced at the discharge-spout and funnel to hasten its flow.

The invention is illustrated in the accompanying drawings, in which—

Figure 1:
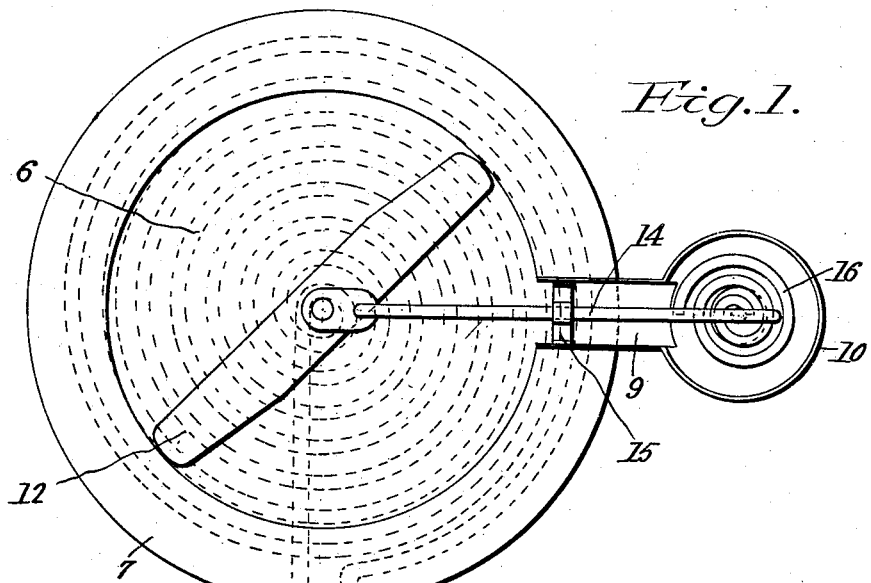
Figure 2:
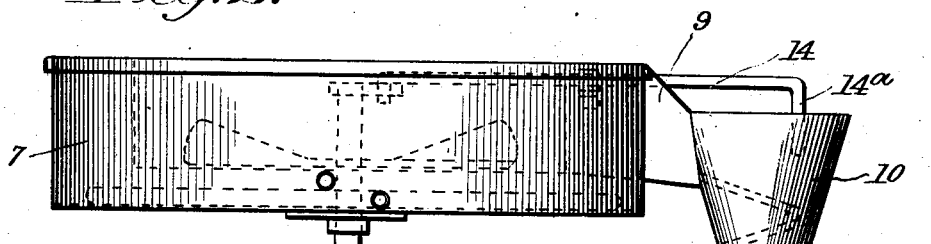
Figure 3:
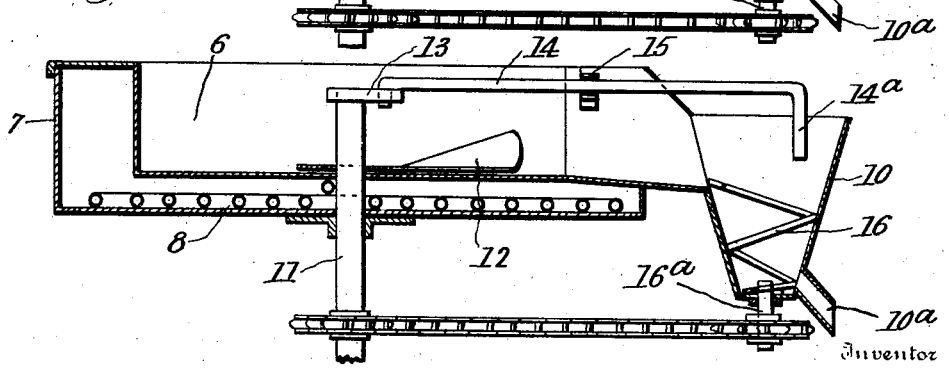

Figure 1 is a plan view of the device. Fig. 2 is a side elevation thereof, and Fig. 3 is a vertical section.

Referring specifically to the drawings, 6 indicates a pan to receive and contain the lead. This pan has a jacket 7 spaced therefrom and inclosing the bottom and sides thereof. Between the jacket and the pan is a coil of pipe 8, through which cold water is passed and which effects the cooling action. At one side of the pan is an out-spout 9, through which the lead is discharged into a funnel, (indicated at 10.) The pan is preferably circular, and at the center thereof is a shaft 11, which passes vertically through suitable boxings in the bottom of the pan and jacket and is driven by any suitable means, such as pulley and belt, connected thereunder. The shaft carries a scraper 12, which revolves in the pan and is formed of inclined blades, which are so shaped as to tend to force the viscous material toward the circumference of the pan and out through the spout. At the top of the shaft is a crank 13, of small throw, to which is connected the inner end of a stirring-rod 14, which is caused to reciprocate by the action of the crank. The outer end of the rod is bent down to form a finger 14$^a$, which extends adjacent the mouth of the spout into the funnel, as shown. The rod works through a guide and supporting piece 15, bridged across the spout.

Within the funnel is a spiral or worm blade 16 on a shaft 16$^a$, which finds its bearings in the lower end of the funnel and is driven by gearing from the main shaft 11. This worm smoothes and finishes the lead by rubbing it against the side of the funnel and feeds and forces it out of the small spout 10$^a$ into a shipping can or keg.

The material is fed into the pan in any desired manner, and the action of the scraper gradually forces it out through the spout, and owing to the viscous nature of the stuff its flow from the spout and through the funnel into a can or keg is materially assisted by the action of the stirrer, the finger of which moves about in the funnel at the mouth of the spout, and by the worm, which smoothes and finishes the lead and acts to force and feed it out of the funnel.

What I claim as new, and desire to secure by Letters Patent, is—

1. In a paint-cooler, in combination, a pan having a jacket inclosing the bottom and sides thereof, and a discharge-spout at the circumference, pipes for a cooling medium between the pan and its jacket, and a vertical shaft at the center of the pan having radial blades scraping across the bottom of the pan and forcing the paint through the spout.

2. The combination with the pan and the discharge-spout therefrom, and the vertical crank-shaft with a scraper thereon in the pan, of a stirrer adjacent the mouth of the spout, connected to and operated by the crank.

3. In an apparatus for delivering viscous material, the combination with a receptacle having a discharge-spout at the side thereof, of a scraper in the receptacle forcing the material toward the side thereof and out through the spout, a stirrer working adjacent the mouth of the spout, and means to operate the scraper and stirrer, substantially as described.

In testimony whereof I affix my signature in presence of two witnesses.

ANDREW JUIF.

Witnesses:
A. O. MORAN,
ELIZABETH J. PRICE.